July 12, 1966  E. JAULMES  3,260,535
COLLAPSIBLE BICYCLE

Filed Feb. 11, 1964  2 Sheets-Sheet 1

INVENTOR
ERIC JAULMES
BY  KARL KEATH
ATTORNEY

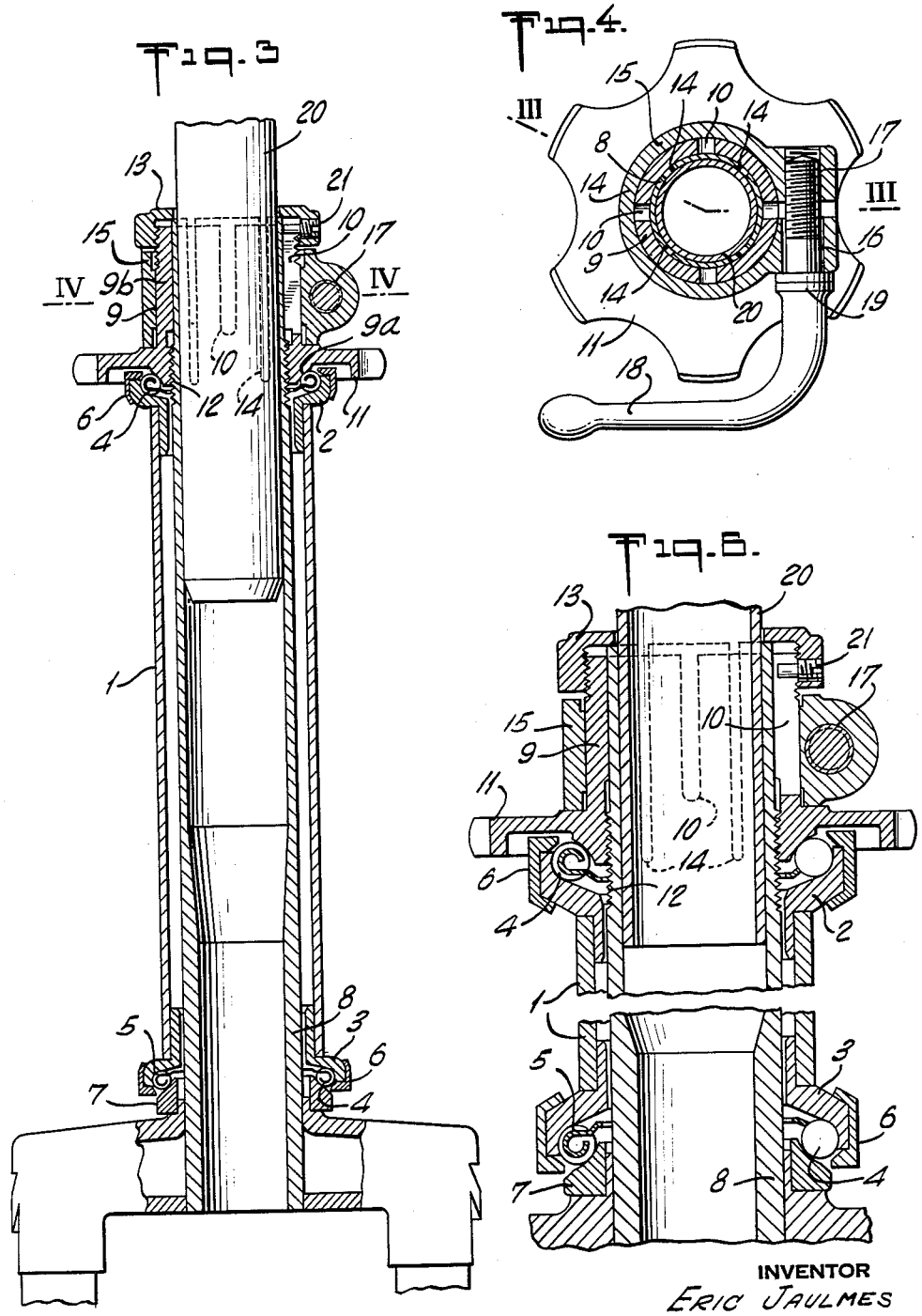

United States Patent Office 3,260,535
Patented July 12, 1966

3,260,535
COLLAPSIBLE BICYCLE
Eric Jaulmes, Paris, France, assignor to Ateliers de la Motobecane, Pantin, Seine, France, a corporation of France
Filed Feb. 11, 1964, Ser. No. 344,138
Claims priority, application France, July 30, 1963, 943,067
9 Claims. (Cl. 280—279)

The present invention relates to a collapsible bicycle which can be readily disassembled or taken apart for the convenient storage and/or shipment thereof within a reduced space, on the one hand and reassembled substantially instantly and expeditiously by the average person for use when desired.

Collapsible bicycles of various designs have already become known heretofore in an effort to facilitate their storage as well as shipment or transport. All the prior constructions have, however, the disadvantage, among others, of increased weight, of being burdensome in use or operation, as well as of being complex mechanically and difficult to assemble and disassemble without special skill or implements. Besides, the known constructions are highly uncomfortable to and fatiguing on the user whereby to practically limit their use or range of operation to relatively short distances, compared with well-known conventional or non-collapsible bicycle structures. Moreover, the previously known collapsible bicycles frequently require non-standard wheels and tires, a serious shortcoming not only from the practical and economical point of view, but greatly impeding or restricting their general adoption not the least by reason of their different appearance compared with the conventional bicycle structures known in the art.

Accordingly, an important object of the present invention is to minimize or eliminate the foregoing and related difficulties and shortcomings inherent in the known collapsible bicycle structures by the provision of an improved collapsible bicycle which is both simple in design as well as easy to assemble and disassemble by the average person, substantially without any special skill or experience.

Among the more specific objects of the invention is the provision of a collapsible bicycle, wherein substantially the entire assembly or mounting mechanism of the component parts or units thereof is disposed upon or operably associated with the steering tube or socket forming part of the bicycle frame which also supports the rear wheel and saddle of known construction; wherein the assembly units or components consist substantially of the frame carrying the rear wheel and including the socket or steering tube, on the one hand, and the fork carrying the front wheel and including the pivot tube mounted in said steering tube in the assembled position, on the other hand; a handle bar or unit including a plunger being advantageously mounted within said pivot tube, all said units being of substantially standard or conventional design, whereby to preserve the appearance of the standard bicycle design aside from other advantages readily understood.

Yet another object of the invention is the provision of an improved collapsible bicycle structure of the general type referred to, wherein the bearing thrust or pressure between the steering and pivot tubes may be set in advance and during fabrication, substantially without requiring any readjustment or correction during mounting or assembly, whereby to greatly expedite and facilitate the assembly operation by the average user.

The invention, both as to the foregoing and ancillary objects as well as novel aspects thereof, will be better understood from the following detailed description of a preferred practical embodiment, taken in conjunction with the accompanying drawing forming part of this specification and wherein:

FIG. 3 is an enlarged longitudinal sectional view, taken on line III—III of FIG. 4, of the steering tube, pivot tube and plunger tube assembly and associated locking mechanism according to the invention;

FIG. 4 is a sectional view of the locking mechanism on an enlarged scale and taken on line IV—IV of FIG. 3;

FIG. 6 is a partial view of FIG. 3 showing on an enlarged scale and in greater detail the assembly and locking mechanism of the bicycle components according to the invention.

Like reference numerals denote like parts in the different views of the drawing.

In a conventional bicycle the steering tube or socket forming an integral part of the frame is fitted at both its ends with dish-shaped flanges or extensions forming the races of ball bearings for supporting the pivot tube forming part of the fork structure of the bicycle. The pivot tube adapted for mounting within the steering tube carries a futher race or cone for cooperation with the lower race of said steering tube, to form a first thrust bearing, while a screw threaded upon the upper part of the pivot tube forms a further race or cone for cooperation with the upper race of said steering tube, to provide a second thrust bearing supporting the fork structure. Regulation of the bearing thrust or pressure may be effected by tightening and untightening said screw. In order to dismantle or remove the fork, it is sufficient to remove the screw after previously withdrawing the handle bar plunger from the pivot tube by loosening its spanner or spreader element disposed within said plunger by means of a key or the like implement. The fork will then drop out of the steering tube accompanied by the fall or spilling of the balls which may be recovered with difficulty only.

According to one aspect of the present invention, that is, in order to enable a safe and expeditious separation of the fork and frame, each of the sets of balls of the bearings are mounted in a cage supported by the steering tube by a retaining ring fitted to the outer end of the respective ball bearing races.

Furthermore, in a conventional bicycle the handle bar is mounted at an adjustable height by its plunger tube being inserted in the pivot tube of the fork, said plunger tube being split longitudinally and locked against the inside wall of said pivot tube by a spanner element disposed inside said plunger tube.

According to another aspect of the present invention, the plunger tube is of smooth or nonsplit construction, its locking against the inside of the pivot tube being achieved by the aid of outer clamping ring or collar engaging the outside of the pivot tube, being elastic or split for this purpose, and tightened manually without any special tool or implement.

Finally, means are provided in accordance with the present invention to locate or limit the adjustment of the locking screw or head connecting the steering tube of the frame with the pivot tube of the fork, whereby to insure a predetermined and constant bearing pressure or thrust independently of the assembly operation of the bicycle. As a consequence, the bicycle can be disassembled and assembled by the average person without requiring any critical adjustments, for storage and shipment within a minimum of space, such for instance in the trunk of an automobile, in the manner as will become further apparent as the following description proceeds in reference to the drawings.

Figure 1:
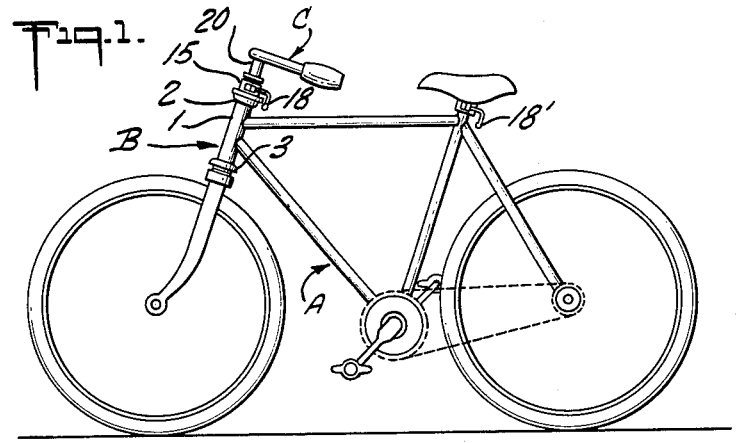
FIG. 1 is an elevation schematically showing a collapsible bicycle constructed in accordance with the principles of the invention, the parts of the bicycle being shown in the assembled position.
Figure 2:
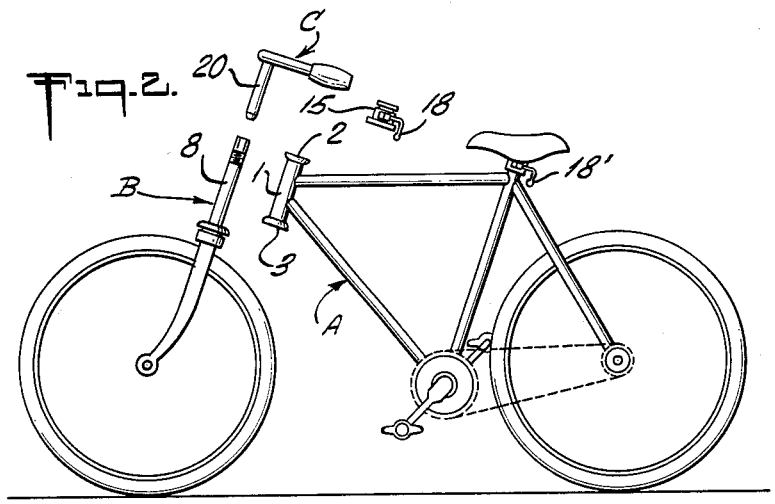
FIG. 2 is a view similar to FIG. 1 and showing the bicycle in the disassembled position.
Figure 5:
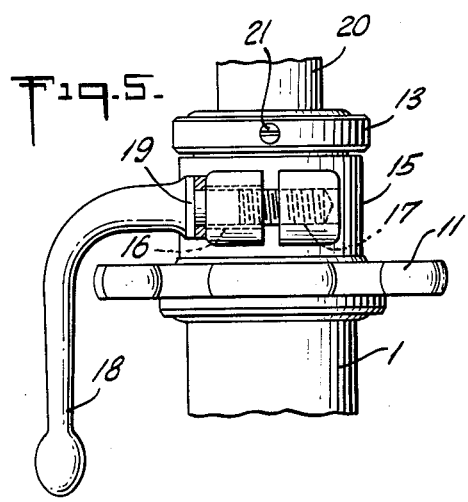
FIG. 5 is an elevation view of the locking mechanism of FIG. 4.

Referring more particularly to FIGS. 1 and 2, the bicycle shown comprises essentially a frame unit or structure including the steering tube, pedal, saddle and rear wheel and being collectively designated by the letter A in the drawing, a fork unit or structure including the front wheel and designated by B, and a handle bar C, all said units being of well-known construction. According to the present invention, the component parts or units A, B and C may be readily and expeditiously separated or disassembled for the convenient storage and/or shipment in collapsed condition within a reduced space.

The steering tube 1 forming part of the frame A is fitted at both its ends with dish-shaped extensions or flanges 2 and 3 forming, in the example shown, the races of ball bearings adapted to receive a number of spherical balls 4, FIG. 3, retained or mounted within cages 5, in a manner well known in the ball-bearing art. The balls 4 or cages 5, in accordance with the present improvements, are confined within the races and dishes 2 and 3 by the provision of peripheral retaining rings 6 being secured to the outer edges of said dishes, whereby to enable an instant and expeditious assembly and disassembly of the bicycle without the danger of the balls becoming loose or spilling, in the manner as will become further apparent as the description proceeds.

Secured in a known manner to the lower end or base of the pivot tube 8 forming part of the fork B of the bicycle is a first or lower cone 7 forming a cooperating race in conjunction with the dish or race 3 in the assembled position of the bicycle, as more clearly shown by FIGS. 3 and 6. In accordance with the improvements of the present invention the upper cone 9a forming the cooperating race in conjunction with the dish or race 2 is part of a removably mounted locking head or mounting member 9 including a cylindrical sleeve 9b provided with longitudinal slits 10 and being fitted with internal threads adapted to engage or cooperate with external threads 12 of the pivot tube 8, to longitudinally adjust said head and to establish a proper cooperating relation between the balls 4 and associated races 2, 9a and 3, 7, respectively, by the aid of a manual locking ring or wheel 11 also forming part of the member 9.

In order to preset the bearing pressure during fabrication and to dispense with any later resetting or readjustments during reassembly of the bicycle, suitable stop or abutment means being permanently fixed during manufacture are provided in accordance with a further feature of the invention, said stop means being comprised, in the example shown, of a perforated screw cap 13 having internal threads engaging a further set of external threads upon the end of the sleeve 9b, said cap being preset and fixed by set screws 21 engaging slits 10 in said sleeve which advantageously serve the further purpose of providing adequate resiliency, as will be further understood from the following. As a consequence, the cap 13 acts as a stop or abutment in conjunction with the upper edge of the pivot tube 8, whereby to limit the extent of relative adjustment of setting of the head 9 and, in turn, to positively predefine the thrust or bearing pressure between the balls 4 and the races 2, 9a and 3, 7, respectively. Proper function of the bearings is thus ensured independently of the assembly and disassembly operations which may be carried out by the average user substantially without the exercise of any special skill or experience.

In order to mount and remove the handle bar C having a plunger tube 20, there is provided a split mounting or clamping ring or collar 15 adapted to engage the outside of the sleeve 9b of the locking head 9 between the adjusting wheel 11 and the limiting cap 13. One of the radial extensions of the collar 15 has a smooth perforation 16, while the other extension has a tapped perforation 17 for the reception of the threaded portion of an angular clamping lever 18 having an abutment or limiting shoulder 19 corresponding to a predetermined clamping pressure, in a manner readily understood. As a consequence, with the plunger tube 20 of the handle bar fitting or frictionally engaging the inside of the pivot tube 8, the latter being advantageously longitudinally slitted as at 14, and secured by the clamp 15, slitting of the tube plunger 20 and the use of a special spanner is dispensed with in the case of the present invention.

Advantageously, the set screws 21 serving to lock the cap 13 against rotation engage one of the slits 10 of the sleeve 9b of the locking head 9, the preferred number of set screws being three and the preferred number of slits 10 being equal to four, whereby to enable locking of the cap 13 at a position sufficiently close to the position of optimum pressure of the ball bearings 2, 4, 9a and 3, 4, 7, respectively.

With the bicycle being assembled and the main component parts being in the position as shown by FIGS. 1 and 3, disassembly, as shown by FIG. 2 is effected in the manner described in the following.

At first, the lever 18 is unscrewed, whereby to result in the loosening of the split collar 15 and the elastic expansion in the radial outward direction of both the sleeve 9b of the locking head 9 and of the end portion of the pivot tube 8. As a consequence, the plunger tube 20 will be loosened to slide within the pivot tube 8, whereby to allow of easy withdrawal of the handle bar C.

The locking head 9 is then unscrewed and separated from the pivot tube 8, while the cap 13 remains in its previously set or adjusted position. As a consequence, the pivot tube 8 is allowed to drop or descend through the steering tube 1 to result in the separation of the parts, in the manner shown by FIG. 2. Due to the presence of the retaining rings 6, the sets of balls 4 are confined within the races 2 and 3 attached to the tube 1. The separated components parts A, B and C may be stored and/or transported in collapsed position or separately, as may be desired.

Assembly of the bicycle is effected in the reverse order in the manner described in the following.

At first the pivot tube 8 is inserted from below into the steering tube 1, whereupon the locking head 9 is screwed in place upon the tube 8 until arrested by the cap 13 and the plunger tube 20 of the handle bar is thereafter inserted from above into the pivot tube to the desired height or adjusting position. Finally, the split collar 15 is tightened to firmly lock the plunger tube 20 and to locking head 9, the component parts now being in the proper assembled position, FIG. 1, and ready for immediate use of the bicycle.

From the foregoing, its is seen that a readjustment of the ball or equivalent bearing pressure is not required during assembly of the bicycle due to the construction of the assembly and locking means according to the invention. In the assembled position of the bicycle, the inner edge near the perforation in the cap 13 engages, in the example shown, the upper edge of the pivot tube 8, thus positively limiting the adjustment of the head 9 and, in turn, defining the proper pressure between its cone 9a the balls 4 and the upper race 2, as well as the pressure between the cone 7, the ball 4 and the lower race 3, respectively. As pointed out, the bearing pressure of the two sets of balls against the cooperating races is adjusted to the proper operating value by screwing and unscrewing the cap 13 during the fabrication of the bicycle, whereupon the cap is set permanently or locked in position by means of the set screws 21 engaging the slits 10, or in any other suitable manner as will suggest itself to those skilled in the art.

In order to simplify and standardize the manufacture of the bicycle according to the invention, the same clamping ring 18', FIG. 1, is advantageously used for the mounting and adjustment of the saddle as serves for the locking of the parts 8, 9 and 20 of the assembly mechanism.

Inasmuch as the handle bar C is separated from the fork B and frame A in the disassembled condition, the bicycle is advantageously equipped with a free-wheeling brake associated with the rear wheel in order to dispense with a special Bowden cable or the like transmission means between the component parts. The cable connecting the handle of the front wheel brake may have a sufficient length to enable disassembly of the handle bar while disconnecting the cable. Besides, no electric connection need be separated or re-established between the component parts A and B of the bicycle which advantageously includes a lighting dynamo operably driven by the front wheel and a red backlight energized by either a primary or storage battery.

In the foregoing the invention has been described in reference to a specific illustrative device. It will be evident, however, that variations and modifications, as well as the substitution of equivalent parts or elements for those shown for illustration, may be made without departing from the broader spirit and purview of the invention as defined by the appended claims. The specification and drawing are accordingly to be regarded in an illustrative rather than in a restrictive sense.

I claim:

1. In a collapsible bicycle comprising a frame unit adapted to support a rear wheel and including a steering tube, a fork unit adapted to support a front wheel and including a pivot tube for mounting within said steering tube, a first bearing element in fixed relation to and extending transversely from the lower end of said steering tube, a second bearing element in fixed relation to and extending transversely from the upper end of said steering tube, a third bearing element in fixed relation to and extending from said pivot tube, to provide a first thrust bearing by said first and third elements in the assembled position of said tubes, and a locking member mounted in relatively longitudinally adjustable relation upon said pivot tube and including a portion forming a fourth bearing element, to provide a second thrust bearing by said second and fourth elements, and adjustable stop means mounted upon said member, to limit the adjusting position thereof by said stop means engaging said pivot tube, said stop means adjusted relative to said member, to produce a predetermined operating pressure of said bearings in the limit adjusting position of said member.

2. In a collapsible bicycle as claimed in claim 1, said elements forming the races of a pair of ball bearings, sets of balls each mounted in a cage and interposed between cooperating races of said bearings, and peripheral confining means forming part of each of said first and second bearing elements, to retain said balls in operative position in the disassembled position of said tubes.

3. In a collapsible bicycle as claimed in claim 1, said locking member including a sleeve in close fitting engagement with the outside of said pivot tube, a handle bar having a plunger tube insertable in and frictionally engaging the inside of said pivot tube, and releasable clamping means engaging the outside of said sleeve, to lock said sleeve into tight engagement with both said pivot and plunger tubes.

4. In a collapsible bicycle as claimed in claim 3, said clamping means being comprised of a split elastic ring encircling said sleeve and fitted with an adjustable clamping screw, said sleeve being located adjacent to the end of said pivot tube in the assembled position, and said sleeve and pivot tubes being provided with longitudinal slits in the vicinity of said ring.

5. In a collapsible bicycle as claimed in claim 1, said locking member being provided with internal threads adapted to engage a series of external threads of said pivot tube and including a cylindrical sleeve in close fitting frictional engagement with the outside of said pivot tube, and said stop means being comprised of a screw cap engaging the threaded end of said sleeve, and means to adjust and lock said cap upon said sleeve in a predetermined relative position thereto, whereby said cap acts as an abutment engaging the edge of said pivot tube in the limit position of said locking member.

6. In a collapsible bicycle as claimed in claim 5, including a handle bar having a plunger tube, said cap having a central opening for passing said plunger tube frictionally fitting within said pivot tube, and said clamping means being comprised of a split clamping ring encircling said sleeve and fitted with a clamping screw, to lock said sleeve into tight engagement with both said pivot and plunger tubes in the assembled position.

7. In a collapsible bicycle comprising a frame unit adapted to support a rear wheel and including a steering tube, a fork unit adapted to support a front wheel and including a pivot tube for mounting within said steering tube, a first dish-shaped bearing element forming a ball bearing race and secured to the lower end of said steering tube, a second dish-shaped bearing element forming a ball bearing race and secured to the upper end of said steering tube, a first cone element mounted upon said pivot tube and forming a cooperating race with said first bearing element in the assembled position of said tubes, a locking member including a second cone element and a sleeve having internal threads engaging external threads of said pivot tube in relatively longitudinally adjustable connection therewith, to provide a ball bearing race by said second cone element cooperating with said second bearing element in a predetermined adjusting position of said member, ball bearing cages holding sets of balls interposed between the cooperating ball bearing races at the lower and upper ends of said steering tube, respectively, to provide a pair of thrust ball bearings and to result in a predetermined operating pressure of said bearings in said predetermined adjusting position of said member, peripheral confining rings forming parts of said first and second bearing elements, to retain said balls in operative position in the disassembled position of said tube, and adjustable stop means upon said sleeve to limit the adjusting position of said member to said predetermined position by said stop means engaging said pivot tube.

8. In a collapsible bicycle as claimed in claim 7, said stop means being comprised of a screw cap mounted upon the end of said sleeve and cooperating with the end of said pivot tube as an abutment element, and set screw means to lock the adjusting position of said cap.

9. In a collapsible bicycle as claimed in claim 8, said cap having a central perforation, a handle bar including a plunger tube passing through said perforation and frictionally engaging the inside of said pivot tube, and releasable clamp means to lock said sleeve into clamping engagement with both said pivot and plunger tubes.

References Cited by the Examiner

UNITED STATES PATENTS

| | | | |
|---|---|---|---|
| 492,988 | 3/1893 | Pease | 280—279 |
| 2,551,503 | 5/1951 | Needham | 280—279 |

FOREIGN PATENTS 1,286   1896   Great Britain.

KENNETH H. BETTS, *Primary Examiner.*